United States Patent [19]
Collins et al.

[11] Patent Number: 5,778,433
[45] Date of Patent: *Jul. 7, 1998

[54] COMPUTER SYSTEM INCLUDING A FIRST LEVEL WRITE-BACK CACHE AND A SECOND LEVEL CACHE

[75] Inventors: Michael J. Collins; Gary W. Thome, both of Tomball, Tex.

[73] Assignee: Compaq Computer Corporation, Houston, Tex.

[ * ] Notice: The term of this patent shall not extend beyond the expiration date of Pat. No. 5,581,727.

[21] Appl. No.: 665,244

[22] Filed: Jun. 17, 1996

Related U.S. Application Data

[63] Continuation of Ser. No. 44,379, Mar. 22, 1993, Pat. No. 5,581,727.

[51] Int. Cl.$^6$ ........................................... G06F 12/08
[52] U.S. Cl. ............................ 711/135; 711/122; 711/143
[58] Field of Search ........................... 395/462, 449, 395/470; 711/117, 121, 122, 135, 141–146

[56] References Cited

U.S. PATENT DOCUMENTS

| | | | |
|---|---|---|---|
| 4,755,930 | 7/1988 | Wilson, Jr. et al. | 711/122 |
| 5,241,681 | 8/1993 | Hamid et al. | 395/500 |
| 5,276,848 | 1/1994 | Gallagher et al. | 711/121 |
| 5,307,477 | 4/1994 | Taylor et al. | 711/3 |
| 5,317,720 | 5/1994 | Stamm et al. | 711/143 |
| 5,355,467 | 10/1994 | MacWilliams et al. | 711/146 |
| 5,581,727 | 12/1996 | Collins et al. | 711/135 |

OTHER PUBLICATIONS

Pentium Processor User's Manual vol. 1: Pentium Processor Data Book Bus Functional Description, pp. 6–1 to 6–52, 1993.

*Primary Examiner*—Matthew M. Kim

[57] ABSTRACT

An apparatus for monitoring and decoding processor bus cycles and flushing a second level cache upon decoding a special flush acknowledge cycle. The CPU preferably includes an internal cache and a flush input for receiving a signal commanding the CPU to flush its internal cache. After flushing its cache by performing any necessary cycles to write back dirty data to main memory, the CPU performs a special flush acknowledge cycle to inform external devices that the flush procedure has been completed. A cache controller detects the flush acknowledge cycle and provides a flush signal to the second level cache. The cache controller then provides an end of cycle signal to the CPU to indicate that the flush cycle has been acknowledged.

12 Claims, 5 Drawing Sheets

COMPUTER SYSTEM INCLUDING A FIRST LEVEL WRITE-BACK CACHE AND A SECOND LEVEL CACHE

This is a continuation of application Ser. No. 08/044,379 filed Mar. 22, 1993, issued as U.S. Pat. No. 5,581,727 on Dec. 3, 1996.

BACKGROUND OF THE INVENTION

1. Field of the Invention

The present invention relates to determining when to flush a second level cache based on recognizing a special flush acknowledge bus cycle executed by the microprocessor of a computer system.

2. Description of the Related Art

The computer industry is a growing field that continues to evolve as new innovations occur. The driving force behind this innovation has been the increasing demand for faster and more powerful computers. A major bottleneck in computer speed has historically been the speed with which data can be accessed from memory, where this speed is referred to as the memory access time. The microprocessor, with its relatively fast processor cycle times, has generally had to wait during memory accesses to account for the relatively slow memory devices. Therefore, improvement in memory access times has been one of the major areas of research in enhancing computer performance.

In order to bridge the gap between fast processor cycle times and slow memory access times, cache memory was developed. A cache is a small amount of very fast, expensive, zero wait state memory that is used to store a copy of frequently accessed code and data from system memory. The microprocessor can operate out of this very fast memory and thereby reduce the number of wait states that must be interposed during memory accesses.

There are generally two types of cache memory systems: write-through and write-back. In a write-back cache design, the writes are performed only to the cache, with the cache only providing the information to the system when another party requests the address. Thus, when a write "hit" occurs in a write-back cache indicating the cache has data stored for the indicated address, the cache location is updated with the new data, but the write operation is not broadcast to the system memory. In this instance, the cache holds a modified copy of the data and assumes the responsibility providing this modified copy to other requesting devices. When the cache is holding modified data, the corresponding memory locations in system memory are now said to hold incorrect or dirty data. When a cache flush occurs, a write-back cache must write back all modified locations to system memory before the entire cache contents are invalidated.

In a write-through cache design, all writes are often stored in a cache and are always broadcast to the memory. For a write-through cache, the microprocessor, during every memory write cycle, writes the data to the cache as well as to the main memory so that the main memory does not contain obsolete information. Thus, when a cache flush occurs for a write-through cache, the data does not have to be written back to the main memory. A series of tag RAMS, typically accompanying the cache RAM, contains "tags" or a copy of the upper address bits of the memory address of the data contained in the cache, and also valid bits used to identify whether the data located by a tag address is valid or not. To flush a write-through cache, it is only necessary to clear the valid bits in the tag RAMs, since none of the data need be written to main memory.

The management or control of the cache is generally performed by a device referred to as a cache controller. The cache controller is principally responsible for keeping track of the contents of the cache as well as controlling data movement into and out of the cache. Another responsibility of the cache controller is the preservation of cache coherency, which refers to the requirement that the copy of system memory held in the cache be identical to the data held in the system memory. In some systems, a write-back cache is contained within the microprocessor so that the microprocessor performs the cache controller functions described above for its internal cache. The microprocessor with an internal cache also usually includes a pin to receive a flush signal, where the microprocessor responds by flushing its internal cache.

In a typical computer system, a microprocessor, such as the i486 microprocessor manufactured by the Intel Corporation (Intel), is coupled to cache memory and to a cache controller, such as the C5 cache controller, also by Intel. The cache controller and the cache-memory are typically connected between the microprocessor and a host bus and the main memory is typically connected to the host bus. The microprocessor typically includes an internal cache so that the external cache memory is a second level, or level two cache. Thus, the microprocessor operates out of its internal cache until a miss occurs, and then it operates out of the second level cache. If a cache miss occurs in the second level cache, the microprocessor executes a cycle to the host bus to access the main memory.

Another block of logic, referred to as miscellaneous CPU logic, is coupled to the microprocessor, to the cache controller and to the host bus to provide support for the microprocessor. The miscellaneous CPU logic also determines cache flush conditions, and generally includes numeric coprocessor logic, processor reset generation logic, cache support logic, I/O registers and parity error logic as well as other miscellaneous logic. Concerning its cache duties, the miscellaneous CPU logic monitors the host bus cycles and asserts a flush signal to the microprocessor so that the microprocessor responds by flushing its internal cache. The miscellaneous CPU logic may also provide a flush signal to the cache controller, where the cache controller responds by asserting a flush signal to the second level cache. The CPU and cache controller flush signals may be the same or different signals, depending upon whether there are different conditions for flushing the internal cache versus the second level cache. In any event, the cache controller also includes an input pin to receive a flush command and an output pin to flush or invalidate the cache memory.

There are several conditions that are monitored on the host bus by the miscellaneous CPU logic to determine when to flush the respective caches. One condition is a write operation to a certain I/O port, typically referred to as a processor control port, to set a flush bit to initiate an orderly flush procedure. Another condition is when a cache enable bit is negated after the bit had previously been set. The microprocessor may also execute cache invalidate instructions, where the microprocessor invalidates its internal cache, so that the second level cache is also flushed. Several signals on the host bus, including a host memory-I/O signal indicating an I/O cycle rather than a memory cycle, a host data-control signal indicating a control cycle rather than a data cycle, a host read-write signal indicating a write rather than a read cycle and byte enable bits HBE3*-HBE0* indicating a flush instruction, are all used to determine whether a cache invalidate instruction has been issued. Another condition is when write operations are executed to a RAM relocation register, typically residing at the address 80C00000h, which causes flushing of both of the caches. A lower case h at the end of an address designates hexadecimal notation.

The P5 or Pentium microprocessor from Intel is a next generation microprocessor which has very high performance including superscaler architecture and integrated and separate code and data caches. The P5 uses a full 64-bit data path and provides significant performance improvements over the 32-bit data path used in i386 and i486 based computers. The P5 has an internal write-back data cache as well as a flush input pin for receiving a flush signal to command the P5 to flush its internal caches. The P5 also executes a new flush acknowledge special cycle after performing the write-back flush cycles, if any, to inform external devices that it has completed its flush operation of the data cache.

It is desirable in the P5 microprocessor environment to eliminate as many pins on the cache controller as possible, including the flush input to the cache controller of the second level cache.

SUMMARY OF THE PRESENT INVENTION

In a computer system according to the present invention, a second level cache controller monitors and decodes the processor bus cycles and flushes a second level cache accordingly. The second level cache is preferably an optional lookaside, write-through, direct-mapped cache for simplicity. In a direct-mapped cache organization, the physical address space is conceptually divided into a number of equal pages, where the page size equals the size of the cache. Since the second level cache is a lookaside writethrough cache, a write-back procedure need not be performed and thus the second level cache may be flushed under the same conditions as the internal cache of the microprocessor. Furthermore, due to the simplicity of the second level cache design, the cache is flushed simply by clearing the valid bits in the tag RAMs provided for the cache memory.

In the preferred embodiment, the microprocessor is the P5 or Pentium processor by Intel, which includes an internal cache and a flush input pin as previously mentioned. A processor utility chip coupled to the host bus monitors predetermined flush conditions on the host bus and asserts the flush signal to the microprocessor. The microprocessor performs a special flush acknowledge cycle after flushing its internal cache as described previously.

It is considered desirable in the preferred embodiment that the host bus be compatible with prior 80386 and i486 systems, where the host bus operates at a slower speed and with a smaller data width than the P5 microprocessor. To take advantage of the increased speed and increased data width of the P5 microprocessor, the main memory is moved from the host bus to be more closely connected to the processor bus of a P5-based computer system. The preferred embodiment includes a memory controller located on the processor board and interfaced to the processor bus, where the memory controller further incorporates all of the functions of the cache controller. The combined cache and memory controller has the advantage of utilizing common input and output signals.

The memory controller is preferably implemented as a plurality of interdependent state machines. Briefly, the memory controller comprises several blocks, including a front end block for handling processor bus interaction, a memory block for interfacing with the main memory, a host block to control the interfaces in the host bus, and a cache controller block for accessing and controlling the optional second level cache. Other logic is included, such as an address decode block for monitoring address and control signals and asserting internal control signals in response.

The front end controller essentially decodes processor cycles to determine which sub-blocks should handle the cycle. The address decoder block decodes the special flush acknowledge cycle executed by the microprocessor and asserts a flush acknowledge signal to the cache controller block. The cache controller block receives signals from the front end controller block and the microprocessor for use by a state machine for tracking cycles on the microprocessor bus. When the P5 processor executes a cycle and the flush acknowledge signal is asserted by the address decoder block, a flush state machine within the cache controller block is activated to assert a tag clear signal to flush the second level cache. The flush state machine also asserts an early processor burst ready signal to the front end controller, which correspondingly asserts the processor burst ready signal to the processor to acknowledge and indicate the end of the cycle.

In this manner, the cache controller monitors and decodes the processor bus cycles to determine when to flush the second level cache. Thus, an external flush input from the processor utility chip is not required, thereby saving an input pin.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
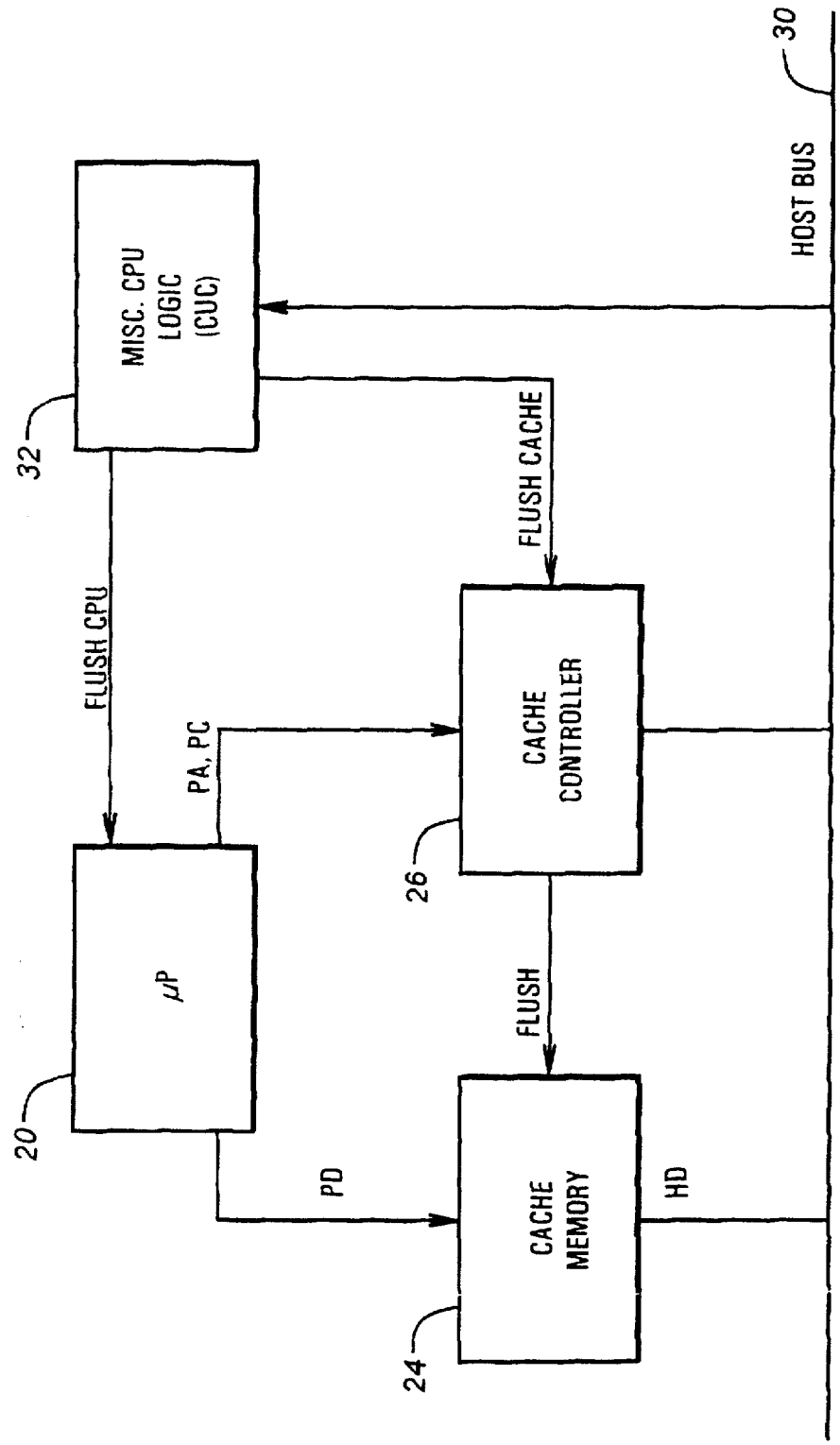
FIG. 1 is a simplified block diagram of the processor portion of a computer system of prior art.

Referring now to FIG. 1, a simplified block diagram of the processor portion of a computer system of prior art is shown, including a cache controller 26 with a flush cache input. A microprocessor 20, such as the i486 from Intel, is coupled to a processor bus, which includes an address bus PA, a data bus PD, and a control bus PC. The data bus PD is coupled to cache memory 24, which is coupled to the data bus HD of a host bus 30. The processor address and control buses PA and PC are connected to the cache controller 26, which is in turn connected to the host bus 30. The cache controller 26 could be the C5 or 82495 cache controller by Intel and the cache memory typically comprises data RAMs, such as the C8 or 82490 data RAMs also by Intel. The microprocessor 20, the cache controller 26 and the cache memory 24 are connected as indicated and as specified by Intel. The microprocessor 20 includes an internal cache and a flush input pin, where the microprocessor 20 flushes its internal cache in response to a FLUSH CPU signal asserted on its flush input pin.

Miscellaneous CPU logic (CUC) 32 is shown connected to the host bus 30 and provides the FLUSH CPU signal to the microprocessor 20 and a FLUSH CACHE signal to a flush input of the cache controller 26. The CUC 32 generally determines the conditions for flushing both the cache of the microprocessor 20 and the cache memory 24. In general, the conditions for flushing the internal cache of the microprocessor 20 as well as the cache memory 24 include write cycles to certain I/O ports, clearing a cache enable bit, the execution of certain invalidate instructions by the microprocessor 20 as well as certain write operations to a RAM relocation port. These conditions are generally known to those skilled in the art. The CUC 32 is also connected to various control signals of the microprocessor 20 and performs other non-cache functions, such as numeric coprocessor functions, microprocessor reset generation and parity error monitoring, among other functions. These functions are not necessary for full disclosure of the present invention and will not be described further.

Figure 2:
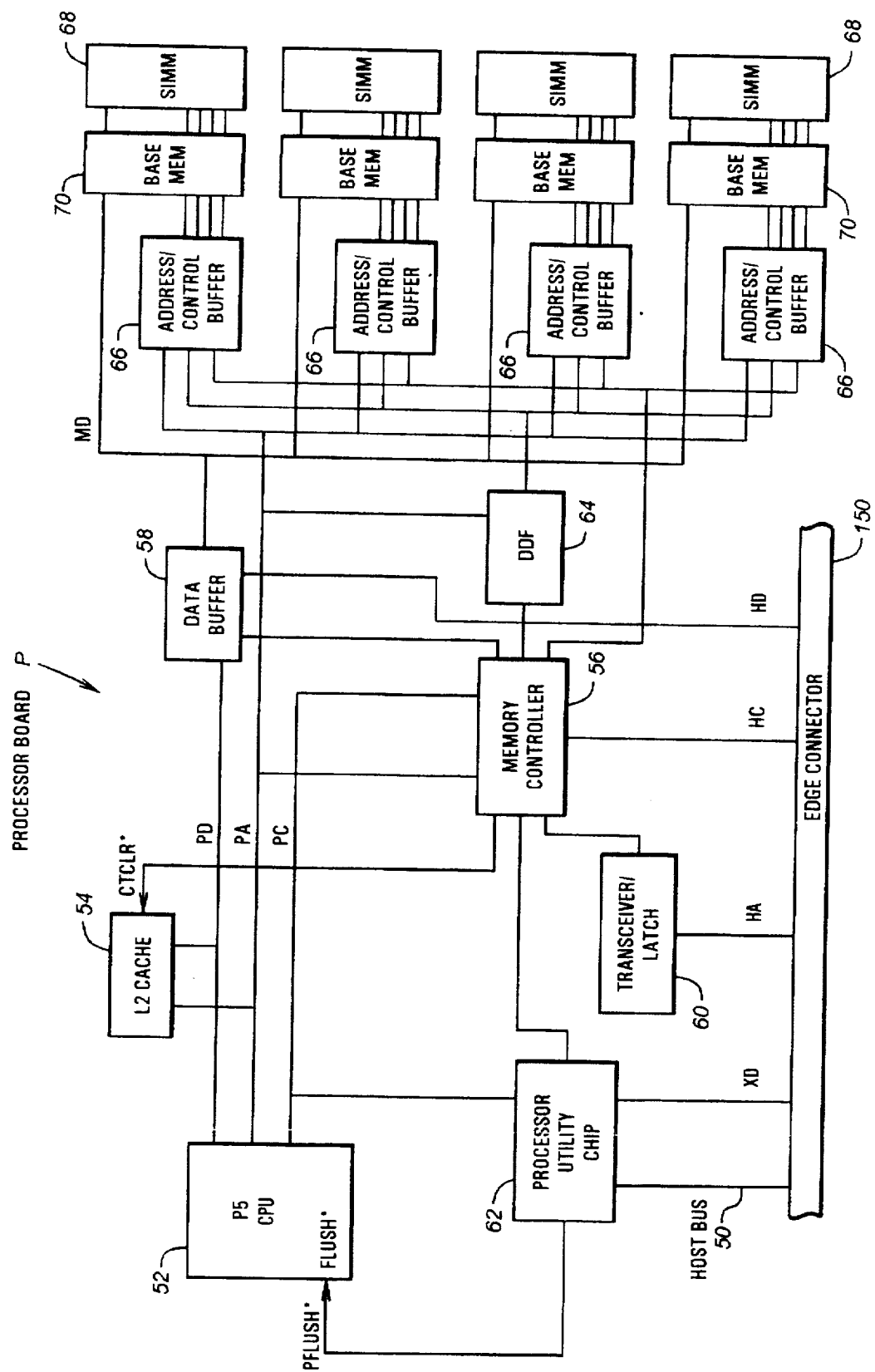
FIG. 2 is a block diagram of a processor board according to the present invention.

Referring now to FIG. 2, a block diagram of a processor board P implemented according to the present invention is shown. The remaining system and I/O portions of the computer system are not necessary for full disclosure of the present invention, and thus are not shown or described for purposes of simplicity. The primary component on the processor board P is a central processing unit (CPU) 52, which is preferably the P5 or Pentium microprocessor from Intel. The P5 is the next generation design after the i486, and is a very high performance microprocessor having superscaler architecture and integrated and separate code and data internal caches. Three buses are connected to the CPU 52, including the PD or processor data bus, the PA or processor address bus and the PC or processor control bus. A second level cache, otherwise referred to as the L2 cache 54, is connected to the PD and PA buses and receives several control signals from a memory controller 56, including a cache clear signal CTCLR*. In the preferred embodiment, the memory controller 56 contains conventional memory controller functions and additionally includes the cache controller capabilities necessary for interfacing the L2 cache 54.

A data buffer 58 is connected to the PD bus and develops two new buses, the HD or host data bus and the MD or memory data bus. The HD bus is part of a host bus H, and is connected to a connector 150 for connection to the system board (not shown) of the computer system. The data buffer 58 is controlled by the memory controller 56. A transceiver/latch unit 60 is connected between the PA bus and the HA bus to provide latching and transceiving capabilities of addresses between the CPU 52 and the host bus H. The transceiver/latch 60 is controlled by the memory controller 56. The memory controller 56 is connected to a unit referred to as the DDF or data destination facility 64. The DDF 64 performs memory module enabling, address translation and memory segment or page property storage.

A processor utility chip 62 provides certain necessary utility operations for use with the CPU 52. The processor utility chip 62 is connected to an XD bus, the host bus H and is controlled by the memory controller 56. The output of the processor utility chip 62 is preferably provided to the PC bus to provide control functions of the CPU 52.

The memory portion of the processor board P is provided as four identical modules, each module containing an address/control buffer 66, one socket for receiving an individual SIMM unit 68 and base memory 70. The address/control buffer 66 receives the PA bus, the address and enable outputs of the DDF 64 and control signals from the memory controller 56. The outputs of the address/control buffer 66 are the addresses provided to the SIMMs 68 or base memory devices 70. As indicated, there are four like modules. Other configurations of the processor board P could be developed, with variations obvious to one skilled in the art.

The CPU 52 operates in a similar manner as the 80386 and i486 microprocessors, where it asserts an address status signal ADS* indicating that a new valid bus cycle is currently being driven by the CPU 52. An asterisk at the end of a signal name indicates negative logic, where the signal is considered asserted when low. When the ADS* signal is asserted, the CPU 52 also drives a signal M/IO* indicating whether the cycle is a memory or I/O operation, a signal W/R* indicating whether the cycle is a write or a read operation and a signal D/C* indicating a data or control cycle. The CPU 52 also asserts eight byte enable bits BE7*-BE0* indicating which bytes of the PD data bus are to be read or written by the CPU 52. In general, the cycle is terminated by an external device asserting a burst ready signal BRDY* to the CPU 52, indicating that the external device has presented valid data for a read cycle or has accepted data in response to a write request. The CPU 52 also supports address pipelining, where the next cycle may begin before the data phase of the previous cycle is completed. An external device asserts a next address signal NA* indicating its preparedness to begin a new cycle. The CPU 52 may thus begin a new cycle by asserting the ADS* signal before or on the same clock cycle as when the BRDY* signal is asserted.

The CPU 52 supports six special cycles indicated by the M/IO* signal asserted low indicating I/O, the W/R* signal asserted high indicating a write cycle and the D/C* signal asserted low indicating a control cycle. The byte enable bits BE7*-BE0* are then used to determine which of the six special cycles is being performed, according to the following Table I:

TABLE I

CPU 52 SPECIAL CYCLES

| BE7* | BE6* | BE5* | BE4* | BE3* | BE2* | BE1* | BE0* | SPECIAL CYCLE DESCRIPTION |
|---|---|---|---|---|---|---|---|---|
| 1 | 1 | 1 | 1 | 1 | 1 | 1 | 0 | Shutdown |
| 1 | 1 | 1 | 1 | 1 | 1 | 0 | 1 | Flush (INVD, WBINVD instr) |
| 1 | 1 | 1 | 1 | 1 | 0 | 1 | 1 | Halt (Halt instruction) |
| 1 | 1 | 1 | 1 | 0 | 1 | 1 | 1 | Write Back (WBINVD instruction) |
| 1 | 1 | 1 | 0 | 1 | 1 | 1 | 1 | Flush Acknowledge (FLUSH* assertion) |
| 1 | 1 | 0 | 1 | 1 | 1 | 1 | 1 | Branch Trace Message |

The first four special cycles, shutdown, flush, halt and write back, are the same special cycles as for the i486 as known to those skilled in the art. The CPU 52 executes cycles to flush its internal cache upon assertion of a signal PFLUSH* on its FLUSH* input pin. The processor utility chip 62 monitors control signals of the CPU 52 and the host bus H to determine when to assert the PFLUSH* signal, where these conditions are similar to those described for the CUC 32. The CPU 52 then preferably executes the flush acknowledge special cycle to indicate to external devices, such as the memory controller 56, that the CPU 56 has completed its flush. The CPU 52 then expects the BRDY* signal to end the cycle. As will be described more fully below, the memory controller 56 includes a cache controller which interprets the special flush acknowledge cycle and asserts the CTCLR* signal to flush the L2 cache 54 and a signal to cause the BRDY* signal to be provided.

Preferably, the L2 cache 54 is a relatively simple 256 kbyte, direct-mapped lookaside, write-through cache for simplicity of logic and operations. The conditions for flushing the L2 cache 54 are the same as for flushing the internal cache of the CPU 52. Since the L2 cache 54 is a write-through cache, it need only clear its valid bits in its tag RAMs to flush. In the preferred embodiment the tag RAMs are the ATT7C174J from AT & T. These tag RAMs include a reset or clear input which causes all of the internal valid bits to be set to the invalid state. The CTCLR* signal is provided to the reset input of the tag RAMs and should preferably be asserted to the L2 cache 54 for a certain predetermined minimum time, which corresponds to four cycles of a clock signal PCLK used to synchronize logic operations. Thus, the CTCLR* asserted to the L2 cache 54 for four cycles of the PCLK signal causes the L2 cache 54 to clear its valid bits, thus flushing the cache.

Figure 3:
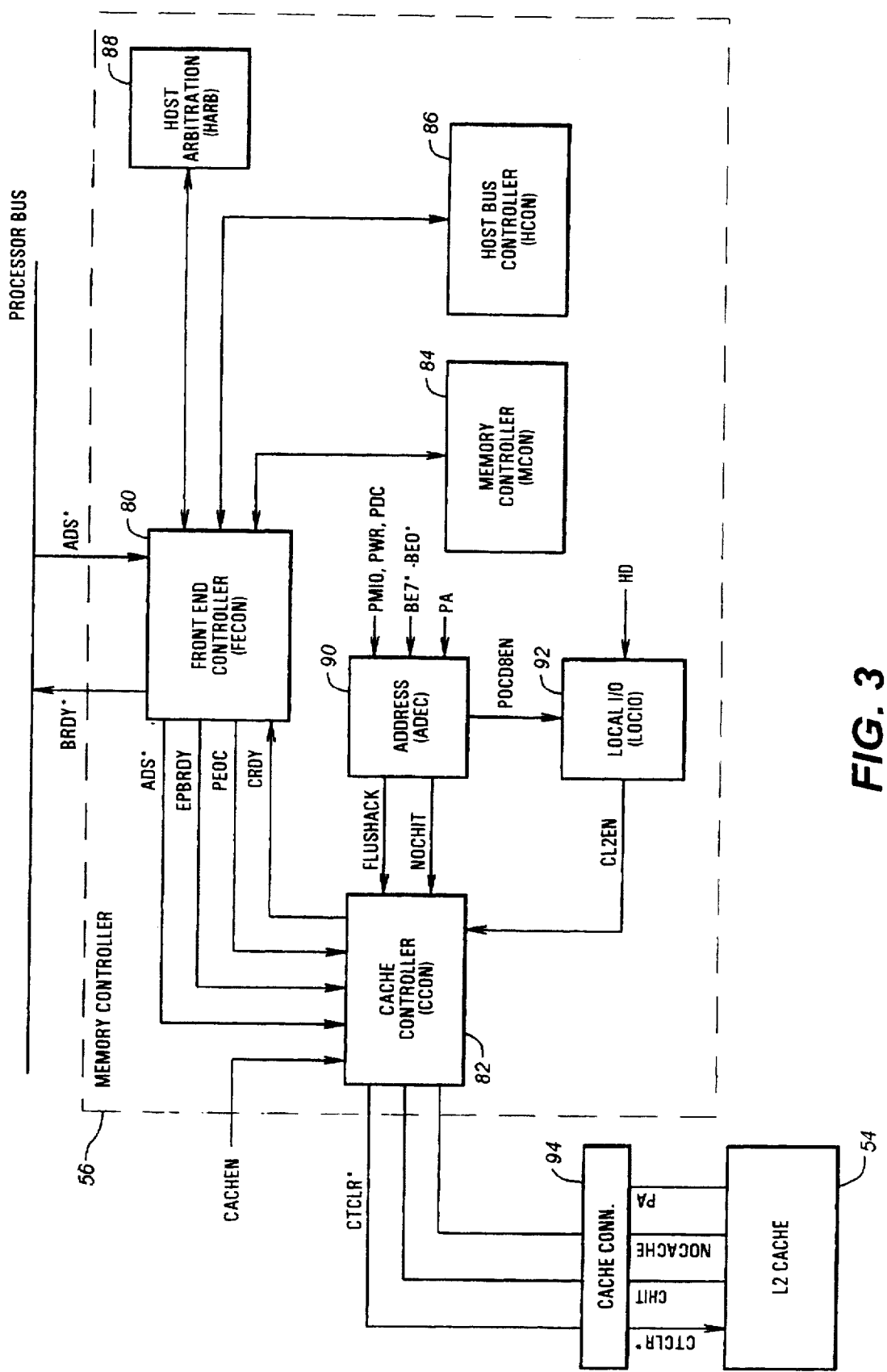
FIG. 3 is a simplified block diagram of the major portions of the memory controller interfaced to the cache memory of FIG. 2.

Referring now to FIG. 3, portions of the memory controller 56 are shown coupled to the processor bus, and also to the L2 cache 54 via a cache connector 94, where the cache connector 94 is located on the processor board P. Preferably, the memory controller 56 is organized as a series of interdependent blocks. Each of these blocks is logically organized to relate to a particular external unit, such as the L2 cache 54, the CPU 52, the memory 70, the host bus H, or arbitration to which it is related. The primary interface to the processor bus is a front end controller block or FECON 80. The FECON 80 interacts with the processor bus and the CPU 52 to do handshaking with the CPU 52, and provides signals which activate a memory controller block or MCON 84 and a host bus controller block or HCON 86. Similarly, the FECON 80 provides the cycle completion signal BRDY* to the CPU 52 when appropriate upon receipt of handshake signals from the MCON 84 or the HCON 86. The MCON 84 interfaces with the address buffer control address/ control buffers 66 to provide the necessary control signals. The HCON 86 interfaces with the host bus H to provide the necessary signals for its operation. Both the MCON 84 and the HCON 86 have handshake communications with the FECON 80.

A cache controller block or CCON 82 interfaces with the FECON 80 and the L2 cache 54 to provide cache controller functions. A host arbitration block or HARB 88 interfaces with the FECON 80 to provide host bus arbitration for the processor board P. Two other blocks shown in FIG. 3 are the address block ADEC 90 coupled to the processor address bus PA, the byte enable bits BE7*-BE0*, the processor control bus PC, and a local I/O block or LOCIO 92. The ADEC 90 and LOCIO 92 are described more fully below.

Preferably, the FECON 80, the MCON 84, the HCON 86 and the CCON 82 are comprised of a plurality of state machines, each acting both independently and interdependently. Each state machine receives certain signals to commence its operation and proceeds according to the receipt of other signals. The various tasks necessary for the memory controller operation of the memory controller 56 is split between these numerous state machines, and between the control blocks as indicated, to allow pipelining and multiple concurrent cycles without requiring an overly complex single master state machine. By the use of the plurality of individual state machines, each operation is allowed to proceed at its greatest possible rate, stopping only when another signal or information is necessary to allow it to proceed.

When the optional L2 cache 54 is installed, a signal NOCACHE is pulled low, indicating its presence. The L2 cache 54 includes cache tag RAMs which monitor the processor address bus PA to determine whether it contains an address hit or miss, as indicated by a signal CHIT. The ADEC 90 monitors the upper processor address bits to develop a signal NOCHIT. When the NOCHIT signal is asserted by the ADEC 90, it indicates an address of the cacheable range, so that the address is not cacheable regardless of the CHIT signal. Thus, a cache hit occurs on the condition CHIT*-NOCHIT. A "●" sign indicates the logical "AND" function. A tilde "~" sign preceding a signal name indicates logical negation.

The ADEC 90 monitors signals PMIO, PWR and PDC, which are latched and synchronized versions of the M/IO*, W/R* and D/C* signals, respectively, where they are synchronized to the PCLX signal. The ADEC 90 also monitors the byte enable bits BE7*-BE0* to decode a special flush acknowledge cycle being executed by the CPU 52. The flush acknowledge special cycle is indicated by the PMIO and PDC signals being low, the PWR signal asserted high and the BE4* signal asserted low. When so indicated, the ADEC 90 asserts a signal FLUSHACK to the CCON 82.

The ADEC 90 also provides a signal POCD8EN to the LOCIO 92 indicating that a cache allocation control port, located at address OCD8h, is being accessed. If so, a signal POCD8EN is asserted by the ADEC 90 to the LOCIO 92. Bit 1 of the cache allocation control port is used to enable or disable the L2 cache 54. The LOCIO provides a signal CL2EN, which is asserted if the L2 cache 54 is enabled.

The FECON 80 monitors the cycles executed on the processor bus by the CPU 52 and generates an early processor burst ready signal, EPBRDY, and a processor end of cycle signal, PEOC, to the CCON 82. The EPBRDY signal indicates that the BRDY* signal to the CPU 52 will be asserted during the next cycle of the PCLK signal. The EPBRDY signal is developed by ORing together a memory read early PBRDY signal, MREPBRDY; a memory write early PBRDY signal, MWEPBRDY; a host read early PBRDY signal, HREPBRDY; a host write early PBRDY signal, HWEPBRDY; and a write protect early PBRDY signal, WPEPBRDY. The MCON 84 asserts the MREPBRDY and MWEPBRDY signals, the HCON 86 asserts the HREPBRDY and HWEPBRDY signals and a state machine within the FECON 80 generates the WPEPBRDY signal in the case of writes to write protected memory or on branch trace messages. These five signals, along with a cache ready signal CRDY, described below, are used to generate the BRDY* signal to terminate data cycles on the processor bus. A signal CA64RD indicates whether the CCON 82 is performing a cache line fill for the L2 cache 54 in response to a non-burst read request from the CPU 52. If so., the BRDY* signal is inhibited by assertion of the CA64RD signal.

The PEOC signal is asserted during the last PCLK signal cycle a burst read cycle, the last PCLK signal cycle of a write-back cycle, or during the last PCLK signal cycle of a single read or write cycle when a signal PBURST* is not asserted. The PBURST* signal indicates a burst cycle is occurring where multiple data cycles are executed, which can be determined by monitoring certain outputs of the P5 CPU 52, such as the CACHE* and PCD outputs, wherein CACHE* ●¯PCD indicates a burst operation.

Figure 4:
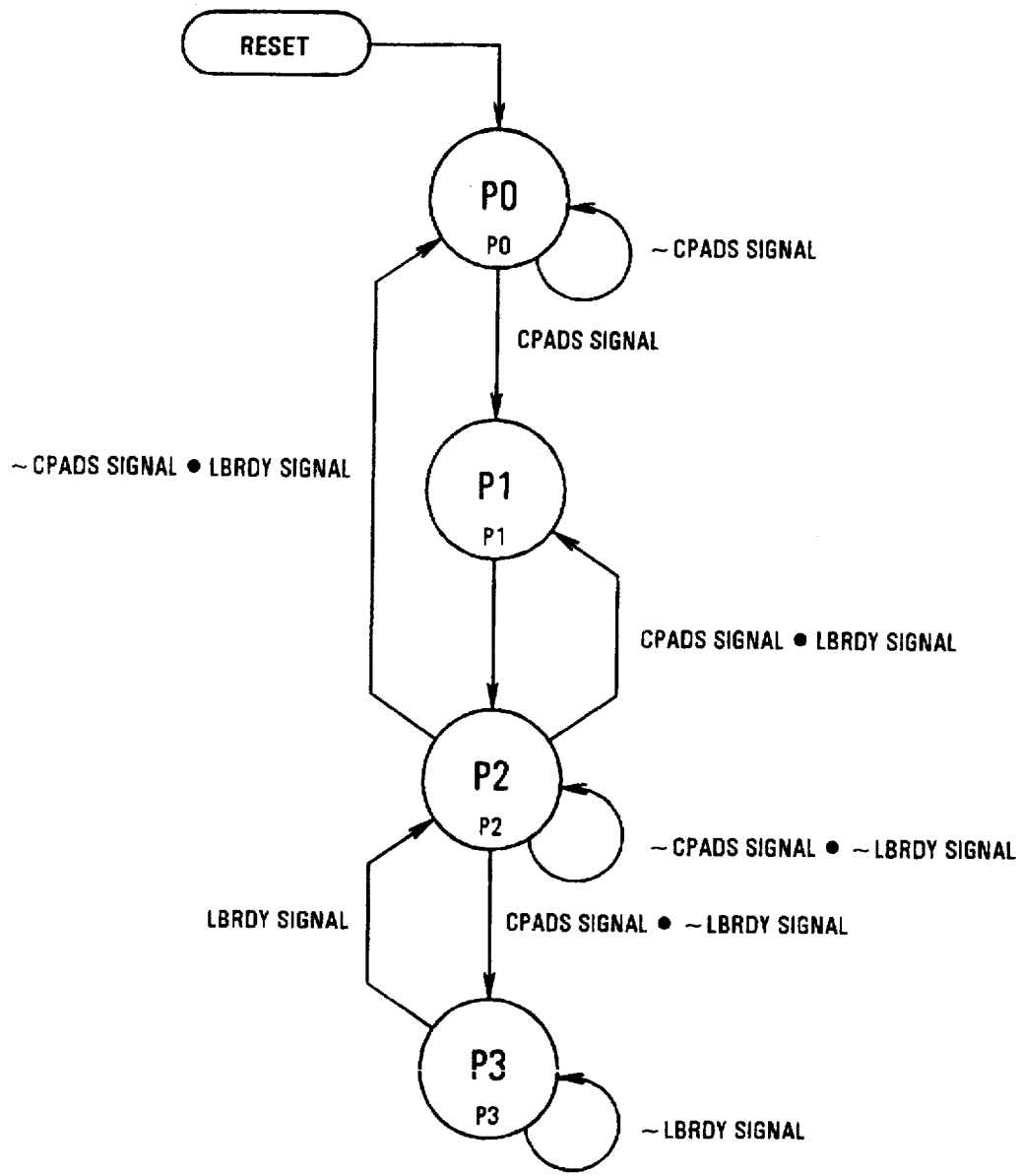
FIG. 4 is a state machine diagram illustrating the operation of a processor tracker state machine within the cache controller block of FIG. 3.

Referring now to FIG. 4, a state machine diagram is shown illustrating the operation of a processor tracker state machine (P5TRKSM) implemented within the CCON 82 of FIG. 3. The P5TRKSM is advanced from one state to the next on the positive edge of the PCLK signal. Upon reset of the computer system, the P5TRKSM enters a state P0, where a signal P0 is also asserted to other state machines within the CCON 82 during state P0. The P5TRKSM remains in state P0 as long as a signal CPADS remains negated. The CPADS signal is the ADS* signal which has been synchronized to the PCLK clock signal and inverted. When a valid cycle is initiated on the processor bus from the CPU 52, the CPADS signal is asserted and the P5TRKSM advances to state P1 upon the next rising edge of the PCLK. A corresponding signal P1 is asserted by the P5TRKSM during state P1. From state P1, operation advances to state P2 on the next rising edge of the PCLK, where a corresponding signal P2 is asserted while in state P2. The CPADS signal and a signal LBRDY determine which state the P5TRKSM advances to on the next rising edge of the PCLK signal. The LBRDY signal depends on many other signals and corresponds to the last BRDY* signal indicating data has been accepted or valid data is being provided for each data cycle. The following equations define the LBRDY signal:

| | |
|---|---|
| LBRDY | = PEOC ● CPRDY |
| CPRDY | := CRDY + EPBRDY |
| CRDY | = L2CACHE_ON ● P1 ● MEMRD ● RDHIT_A ●<br>~NOCHIT ● CHIT + RDHIT_C + FLUSHRDY |
| L2CACHE_ON | := SYNC_CACHEN ● CL2EN ● NOCACHE | where the ":=" signal indicates a registered condition so that the signal on the left side of the equation is true when the conditions on the right side are true at the positive edge of the PCLK signal. The "+" signal indicates the logical "OR" function. It is significant to note that the LBRDY signal is asserted on the first positive edge of the PCLK signal after the PEOC and CPBRDY signals are asserted, indicating the last clock cycle of the current processor cycle. The CRDY signal is a cache ready signal and is provided one PCLK signal cycle early on CCON 82 handled transfers.

The MEMRD signal is true when the PMIO signal indicates a memory cycle and the PWR signal indicates a read cycle. The RDHIT_A signal indicates that a read hit state machine (not shown) residing within CCON 82 is indicating read hits to the L2 cache 54 and is in the initial state. The RDHIT_C signal is provided by the read hit state machine within the CCON 82 indicating that bursted read cycles are in progress and that read hits are occurring.

The SYNC_CACHEN signal is a registered version of a signal CACHEN, which is bit 6 of a RAM setup port located at memory address 80C00002h. The CACHEN signal is also bit 2 of a processor control port, which mirrors bit 6 of the RAM setup port. The RAM setup register is used to enable the primary cache within the CPU 52 and the L2 cache 54, and also contains systems status and control bits. The processor control port contains miscellaneous processor and numeric coprocessor functions. In this manner, the CACHEN signal is used to disable both caches. Thus, the L2CACHE_ON signal indicates that the L2 cache 54 is installed and enabled. The FLUSHRDY signal is asserted by a flush state machine FLUSHSM within the CCON 52, which will be described below.

The P5TRKSM remains in state P2 while the CPADS and LBRDY signals remain negated. If the CPADS signal remains negated and the LBRDY signal is asserted, the state machine advances back to state P0 indicating the end of a non-pipelined cycle. If the CPADS and LBRDY signals are both asserted during state P2, indicating a pipelined-cycle, operation advances back to state P1. If the CPADS signal is asserted while the LBRDY signal remains negated in state P2, also indicating a pipelined cycle, operation proceeds to state P3, where a corresponding signal P3 is asserted. Operation remains in state P3 while the LBRDY signal is negated. When the LBRDY signal is asserted in state P3, operation advances back to state P2. Thus, the P5TRKSM essentially tracks the cycles executed by the CPU 52 to determine the start and the completion of each processor cycle.

Figure 5:
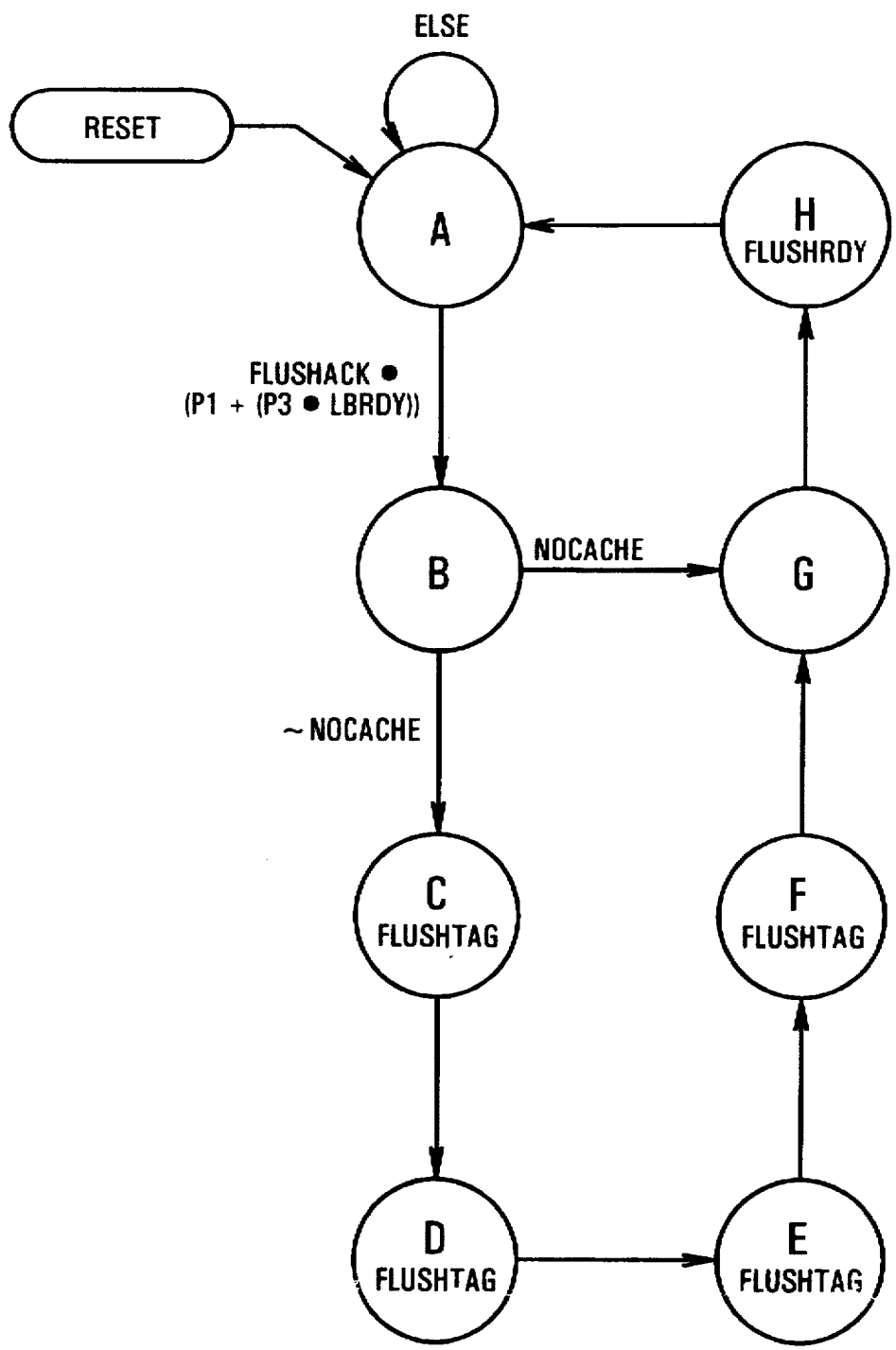
FIG. 5 is a state machine diagram illustrating the operation of a flush state machine within the cache controller of FIG. 3.

Referring now to FIG. 5, a state machine diagram is shown illustrating the operation of the flush state machine FLUSHSM within the CCON 82 of FIG. 3. Again, operation from one state to the next is advanced by the PCLK signal. Upon reset of the computer system, operation begins at a state A until a flush acknowledge special cycle is indicated by the ADEC 90 asserting the FLUSHACK signal. The FLUSHSM advances to state B when the P5TRKSM is in state P1 and the FLUSHACK signal is asserted, or when the P5TRKSM is in state P3 and both the LBRDY and FLUSHACK signals are asserted. In state B, the FLUSHSM advances to a state C if the NOCACHE signal is negated, indicating the L2 cache 54 is installed. The FLUSHSM asserts a signal FLUSHTAG while in state C, which is an internal and inverted version of the CTCLR* signal provided to the L2 cache 54. Operation advances to states D, E and F on consecutive rising edges of the PCLK, where the FLUSHTAG signal remains asserted in states C, D, E and F. Thus, once a flush acknowledge cycle occurs on the processor bus, the CCON 82 asserts the CTCLR* signal low for 4 consecutive cycles of the PCLK signal to flush the L2 cache 54, where the L2 cache 54 correspondingly invalidates all of its data by clearing its valid bits in its tag RAMs. From state F, the FLUSHSM advances to a state G and then to state H on consecutive cycles of the PCLK signal, where the FLUSHRDY signal is asserted in state H. Note that the CRDY is asserted to the FECON 80 upon assertion of the FLUSHRDY signal as indicated by the CRDY equation. The FECON 80 correspondingly asserts the BRDY* signal to the CPU 52 to acknowledge receipt of the flush acknowledge special cycle. Operation advances back to state A from state H on the next rising edge of the PCLK signal.

Referring back to the state B, if the NOCACHE signal is asserted in state B, indicating that the L2 cache 54 is not present, operation advances directly to state G so that the FLUSHTAG and CTCLR* signals are not asserted. In general, when a flush acknowledge special cycle is initiated on the processor bus as indicated by the FLUSHACK and P1 signals, or if pipelined as indicated by the P3, LBRDY and FLUSHACK signals, and if the L2 cache 54 is installed, the FLUSHSM state machine asserts the CTCLR* signal to the L2 cache 54 to flush it. The FLUSHSM also asserts the FLUSHRDY signal which causes the CRDY signal to be asserted to the FECON 80, so that the BRDY* signal is subsequently asserted to the CPU 52.

It can now be appreciated that the cache controller does not need a separate input pin from the processor utility chip 62 to indicate when to flush the second level L2 cache 54. The memory controller 56 is coupled to the processor bus of the CPU 52 and includes state machines for monitoring and decoding cycles executed on the processor bus. The CPU 52 executes a special flush acknowledge cycle indicating that the CPU 52 has flushed its internal cache, which is decoded by the memory controller 56. The CCON 82 correspondingly asserts a flush signal CTCLR* to the L2 cache 54 to cause the tag RAMs to flush. The memory controller 56 then asserts the BRDY* signal to the CPU 52, indicating that the cycle has been acknowledged. By the decoding of the special flush acknowledge cycle, using pins already present for other purposes, an additional pin is not necessary to request the flush.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system, comprising:

a processor bus for carrying cycles, said processor bus including a plurality of lines for indicating the type of cycle being carried on said processor bus;

a first level write-back cache coupled to said processor bus, wherein said first level cache executes a special flush acknowledge cycle indicating completion of flushing of said first level cache after completion of the flushing of said first level cache, said special flush acknowledge cycle being indicated by driving a particular signal set onto said plurality of cycle type lines of said processor bus;

a second level cache coupled to said processor bus, said second level cache including:

cache memory including a clear input for invalidating the data in the cache memory; and a second level cache controller coupled to said processor bus and said second level cache memory for detecting said flush acknowledge cycle, and for providing a clear signal to said second level cache memory clear input in response to said detection;

a CPU incorporating said first level cache and including an input for receiving said flush signal, wherein said CPU first flushes its internal cache and then executes a special flush acknowledge cycle after receiving said flush signal; and an input/output storage system coupled to said CPU, said input/output storage system adapted to provide data to said CPU and said first and second caches.

2. The computer system of claim 1 further comprising:

a memory controller, wherein said memory controller includes said second level cache controller and wherein said processor bus further includes a memory I/O signal, a write-read signal, a data-control signal and a plurality of byte enable signals for indicating said special flush acknowledge cycle and wherein said second level cache controller includes a circuit for monitoring said memory I/O signal, said write-read signal, said data-control signal and said plurality of byte enable signals on said processor bus for detecting said special flush acknowledge cycle, wherein said monitoring circuit provides a flush acknowledge cycle indication signal when said special flush acknowledge cycle is detected.

3. The computer system of claim 2, wherein said second level cache controller further includes:

a processor cycle tracker coupled to said processor bus for providing signals indicating the start and the end of each cycle; and a circuit coupled to said processor cycle tracker, said monitoring circuit, said processor bus and said CPU for asserting said clear signal to said second level cache memory in response to the beginning of a processor cycle when said flush acknowledge cycle indication signal is asserted, and then for asserting said end of cycle signal to acknowledge said special flush acknowledge cycle.

4. A computer system, comprising:

a processor bus for carrying cycles, said processor bus including a plurality of lines for indicating the type of cycle being carried on said processor bus;

a first level write-back cache coupled to said processor bus, wherein said first level cache executes a special flush acknowledge cycle indicating completion of flushing of said first level cache after completion of the flushing of said first level cache, said special flush acknowledge cycle being indicated by driving a particular signal set onto said plurality of cycle type lines of said processor bus;

a second level cache coupled to said processor bus, said second level cache including:

cache memory including a clear input for invalidating the data in the cache memory; and a second level cache controller coupled to said processor bus and said second level cache memory for detecting said flush acknowledge cycle, and for providing a clear signal to said second level cache memory clear input in response to said detection;

a CPU incorporating said first level cache and including an input for receiving said flush signal, wherein said CPU first flushes its internal cache and then executes a special flush acknowledge cycle after receiving said flush signal; and a video display system coupled to said CPU and adapted to display data processed by said CPU.

5. The computer system of claim 4, further comprising:

a memory controller, wherein said memory controller includes said second level cache controller and wherein said processor bus further includes a memory I/O signal, a write-read signal, a data-control signal and a plurality of byte enable signals for indicating said special flush acknowledge cycle and wherein said second level cache controller includes a circuit for monitoring said memory I/O signal, said write-read signal, said data-control signal and said plurality of byte enable signals on said processor bus for detecting said special flush acknowledge cycle, wherein said monitoring circuit provides a flush acknowledge cycle indication signal when said special flush acknowledge cycle is detected.

6. The computer system of claim 5, wherein said second level cache controller further includes:

a processor cycle tracker coupled to said processor bus for providing signals indicating the start and the end of each cycle; and a circuit coupled to said processor cycle tracker, said monitoring circuit, said processor bus and said CPU for asserting said clear signal to said second level cache memory in response to the beginning of a processor cycle when said flush acknowledge cycle indication signal is asserted, and then for asserting said end of cycle signal to acknowledge said special flush acknowledge cycle.

7. A computer system, comprising:

a processor bus for carrying cycles, said processor bus including a plurality of lines for indicating the type of cycle being carried on said processor bus;

a first level write-back cache coupled to said processor bus, wherein said first level cache executes a special flush acknowledge cycle indicating completion of flushing of said first level cache after completion of the flushing of said first level cache, said special flush acknowledge cycle being indicated by driving a particular signal set onto said plurality of cycle type lines of said processor bus;

a second level cache coupled to said processor bus, said second level cache including:

cache memory including a clear input for invalidating the data in the cache memory; and a second level cache controller coupled to said processor bus and said second level cache memory for detecting said flush acknowledge cycle, and for providing a clear signal to said second level cache memory clear input in response to said detection;

a CPU incorporating said first level cache and including an input for receiving said flush signal, wherein said CPU first flushes its internal cache and then executes a special flush acknowledge cycle after receiving said flush signal; and an input/output device coupled to said CPU, said input/output device adapted to transfer data between said CPU and a user.

8. The computer system of claim 7, further comprising:

a memory controller, wherein said memory controller includes said second level cache controller and wherein said processor bus further includes a memory I/O signal, a write-read signal, a data-control signal and a plurality of byte enable signals for indicating said special flush acknowledge cycle and wherein said second level cache controller includes a circuit for monitoring said memory I/O signal, said write-read signal, said data-control signal and said plurality of byte enable signals on said processor bus for detecting said special flush acknowledge cycle, wherein said monitoring circuit provides a flush acknowledge cycle indication signal when said special flush acknowledge cycle is detected.

9. The computer system of claim 8, wherein said second level cache controller further includes:

a processor cycle tracker coupled to said processor bus for providing signals indicating the start and the end of each cycle; and a circuit coupled to said processor cycle tracker, said monitoring circuit, said processor bus and said CPU for asserting said clear signal to said second level cache memory in response to the beginning of a processor cycle when said flush acknowledge cycle indication signal is asserted, and then for asserting said end of cycle signal to acknowledge said special flush acknowledge cycle.

10. The computer system of claim 7, wherein said input/output device is a keyboard.

11. The computer system of claim 7, wherein said input/output device is a mouse.

12. The computer system of claim 7, wherein said input/output device is an audio system.

* * * * *